United States Patent [19]

Nagano et al.

[11] Patent Number: 4,853,632
[45] Date of Patent: Aug. 1, 1989

[54] APPARATUS FOR MAGNETICALLY DETECTING A POSITION OF A MOVABLE MAGNETIC BODY

[75] Inventors: Yoosuke Nagano; Sadao Sekizawa; Toshio Seki, all of Hitachi, Japan

[73] Assignee: Hitachi, Ltd., Tokyo, Japan

[21] Appl. No.: 324,669

[22] Filed: Nov. 24, 1981

[30] Foreign Application Priority Data

Feb. 7, 1981 [JP] Japan .................................. 56-16313
Mar. 11, 1981 [JP] Japan .................................. 56-33969

[51] Int. Cl.$^4$ ..................... G01B 7/14; H01L 43/08; H01L 27/02
[52] U.S. Cl. .................................. 324/208; 307/309; 338/32 R; 357/27
[58] Field of Search ............... 324/207, 208; 307/309; 338/32 R, 33 H; 357/27

[56] References Cited

U.S. PATENT DOCUMENTS 3,800,193 3/1974 Ashar et al. ......................... 357/27
3,816,766 6/1970 Anselmo et al. ................... 307/278
3,846,697 11/1974 Cila ...................................... 324/208
3,916,428 10/1975 Kuninobu et al. ................... 357/27

Primary Examiner—Reinhard J. Eisenzopf
Assistant Examiner—W. Snow
Attorney, Agent, or Firm—Antonelli, Terry & Wands

[57] ABSTRACT

An apparatus for magnetically detecting a position of a movable magnetic body includes a three-terminal magnetic field-intensity sensing structure formed by a pair of magneto-resistors. The magnetic field-intensity sensing structure is disposed opposite to a magnetic body arranged for movement relative thereto in a magnetic field and generates a first electrical signal of sinusoidal waveform in response to a change in the intensity of the magnetic field due to the relative movement of the magnetic body. This first electrical signal appears from the apparatus as a second electrical signal of rectangular waveform or of sinusoidal waveform having an amplified amplitude. Components of the circuit for shaping the waveform of or amplifying the amplitude of the first electrical signal are integrally mounted together with the magneto-resistors on a substrate. Preferably, the shaping or amplifying circuit is in the form of a hybrid integrated circuit formed on the substrate.

27 Claims, 5 Drawing Sheets

APPARATUS FOR MAGNETICALLY DETECTING A POSITION OF A MOVABLE MAGNETIC BODY

This invention relates to an apparatus for magnetically detecting a position of a movable magnetic body including a magnetoelectrical transducer which generates an electrical output signal indicative of a charge in the intensity of a magnetic field.

Application of a magnetoelectrical transducer to the detection of the position or velocity of a moving body of magnetic material has been proposed. Especially, among many attempts, an attempt has been made in which, in order to detect the angular velocity or angular position of rotation of a rotary body mounted on a rotary shaft, a gear of magnetic material is coupled to the rotary shaft to be rotated in a magnetic field, and a change in the intensity of the magnetic field due to the rotation of the gear is sensed to provide an electrical output signal which is used to inspect the state of the rotary body. Another attempt has also been made in which a plurality of very small magnets are arrayed in the circumferential direction of such a rotary body, and a change in the intensity of the magnetic field due to the rotation of the magnets is sensed to provide an electrical output signal which is used to inspect the state of the rotary body.

A construction similar to the latter is disclosed in, for example, U.S. Pat. No. 3,846,697 to Cila et al. entitled "Digital Pickup", filed Nov. 14, 1972 and issued Nov. 5, 1974. The disclosure of this patent is incorporated by reference herein, and reference is to be made thereto for details of the prior art construction. In the disclosed apparatus, a pair of magneto-resistors mounted on a permanent magnet are used to sense the teeth of a gear of magnetic material rotating in a magnetic field produced by the permanent magnet. These magneto-resistors are electrically connected to a bridge circuit which applies its output signal to an integrated circuit incorporated in the apparatus, and an electrical output signal indicative of a change in the intensity of the magnetic field due to the rotation of the gear is generated from this integrated circuit.

When such a magnetoelectrical transducer is to be used as a rotation sensor applied to the control of the rotation speed or angular position of rotation of, for example, an electric motor, an improvement in the resolution of the rotation sensor is demanded for improving the accuracy of control. The resolution of the rotation sensor can be improved by increasing the number of teeth of the gear of magnetic material which is the object to be sensed, that is, the pitch of the teeth of the gear must be selected to be as small as possible within a limited dimensional range. At the same time, on the other hand, the magneto-resistors themselves must also be designed to be as small as possible in size for improving the resolution, since the arrangement of the magneto-resistors is closely related to the pitch of the teeth of the gear which is the object to be sensed.

This results inevitably in the reduction of the withstand voltage capacity of the magneto-resistors themselves, hence, in a lowered level of the voltage applicable to the magno-resistors. Therefore, the output signal from the magneto-resistors has such a tendency that the higher the resolution, the lower is the output signal level. Further, the decreased pitch of the teeth of the gear does not provide an appreciable difference between the magnetic flux density at the position of the crest of the teeth of the gear and that at the position of the bottom of the space between the teeth of the gear. Consequently, the resistance value of each of the magneto-resistors shows a smaller change, that is, there is only a smaller change between the resistance value of the magneto-resistor in the position opposite to the tooth crest and that in the position opposite to the bottom land. Therefore, the level of the output signal from the magneto-resistors becomes correspondingly lower. The lowered level of the output signal from the magneto-resistors gives rise to such a problem that the operation of the rotation sensor is easily adversely affected by external noises. Especially, when the rotation sensor is mounted on the shaft of a rotary machine such as an electric motor to sense the rotation speed of the electric motor as described above, noises due to the leakage flux leaking from the alternating field produced across the winding of the electric motor, noises due to the spark occurring in the commutator part when the electric motor is a DC motor, or like noises will be superposed on the output signal of the magneto-resistors, and the resultant deformed waveform of the electrical output signal will make substantially impossible the desired accurate control of the rotary machine.

It is therefore a primary object of the present invention to solve the prior art problem pointed out above.

In accordance with one aspect of the present invention, there is provided a magnetoelectrical transducer comprising magneto-resistor means disposed opposite to an element of magnetic material arranged for movement relative thereto so that the resistance value of the magneto-resistor means changes in response to a change in the intensity of the magnetic field due to the relative movement of the magnetic element, voltage source means for applying a predetermined voltage across the magneto-resistor means to derive therefrom a first electrical output signal corresponding to the resistance value, circuit means for converting the first electrical signal applied thereto into a second electrical signal having a predetermined waveform and generating such an electrical output signal, and a substrate having the circuit means and the magneto-resistor means integrally mounted thereon.

The above and other objects, features and advantages of the present invention will become more apparent from the following detailed description of preferred embodiments thereof taken in conjunction with the accompanying drawings, wherein.

Figure 1:
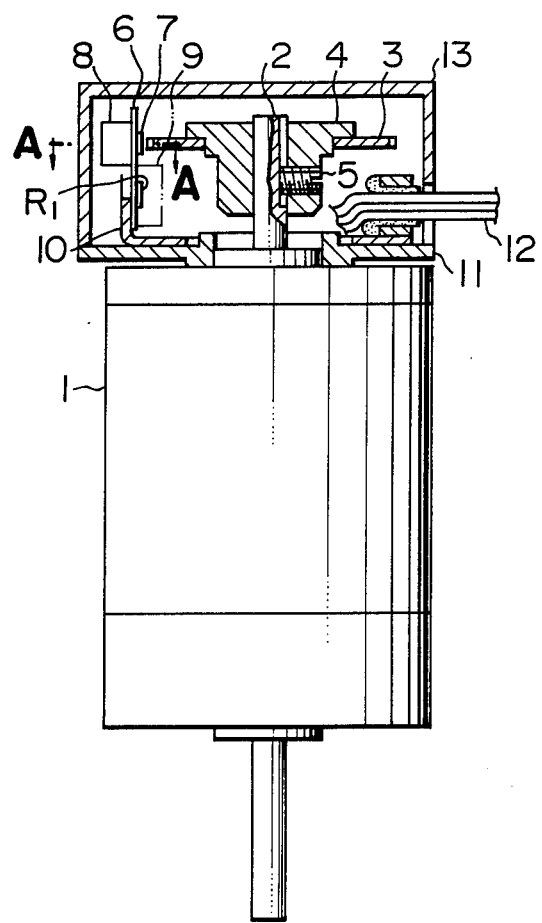
FIG. 1 is a partly sectional, front elevation view of a preferred embodiment of the magnetoelectrical transducer according to the present invention when it is incorporated in a rotary machine as one of its applications.

Referring first to FIG. 1 showing a preferred embodiment of the magnetoelectrical transducer according to the present invention, a gear-shaped disc 3 or gear of magnetic material such as iron is suitably fixedly supported on a hub 4 which is fixedly mounted by a set screw 5 on the shaft 2 of a motor 1 which is an object whose rotation is to be sensed. With the rotation of the motor 1, the gear 3 rotates together with the motor shaft 2.

A pair of magneto-resistors 7, a bias magnet 8 and a waveform shaping circuit 9, which converts or shapes the output signal of sinusoidal waveform generated from the magneto-resistor pair 7 into a rectangular waveform to generate an output signal of rectangular waveform, are integrally mounted on a substrate 6 of electrical insulating material. The waveform shaping circuit 9 is preferably in the form of a hybrid integrated circuit formed on the insulating substrate 6.

The substrate 6 is suitably supported on an L-shaped supporting member 10 which is suitably fixed to the motor 1 with a spacer 11 interposed between it and the motor 1.

Conductors 12 extend from the substrate 6 for supplying the necessary power and transmitting the transducer output signal, and a cover member 13 covers the whole structure of the magnetoelectrical transducer.

Figure 2:
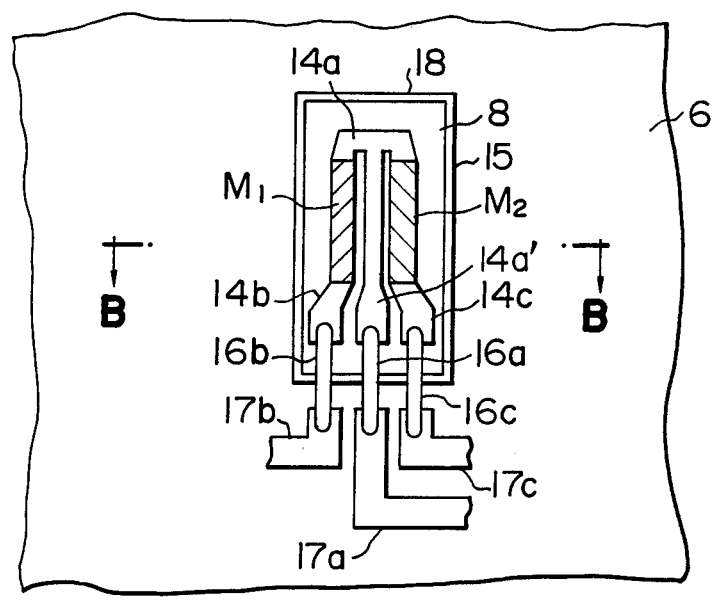
FIG. 2 is an enlarged schematic plan view of the elements including the magneto-resistors shown in FIG. 1.

FIG. 2 is an enlarged schematic plan view of the magneto-resistor pair 7 and associated elements mounted on the substrate 6, when viewed from the side of the gear 3. The magneto-resistor pair 7 includes a first magneto-resistor $M_1$ and a second magneto-resistor $M_2$. The first and second magneto-resistors $M_1$ and $M_2$ are electrically connected to each other at one end of the ends by a conductor 14a and are electrically connected at the other end to conductors 14b and 14c respectively, thereby constituting a three-terminal magnetic field-intensity sensing structure in which one of the three output terminals is provided by the free end of an extension 14a' extending from the middle portion of the conductor 14a, and the remaining two output terminals are provided by the free ends of the conductors 14b and 14c respectively.

The conductors 14a, 14b and 14c are electrically connected at the free end to one end of conductors 16a, 16b and 16c respectively, and the conductors 16a, 16b and 16c are electrically connected at the other end to one end of conductors 17a, 17b and 17c respectively. The conductors 17a, 17b and 17c are deposited on the substrate 6 and are connected at the other end to the waveform shaping circuit 9 whose structure will be described in detail later.

Figure 3:
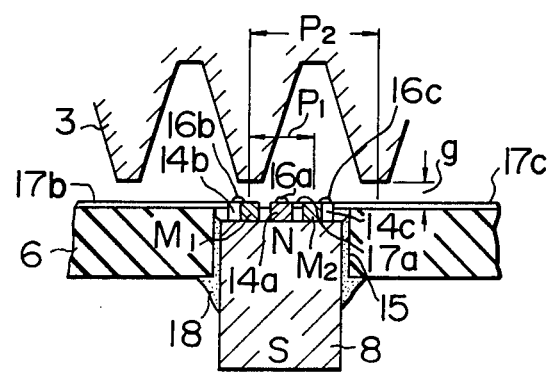
FIG. 3 is an enlarged schematic sectional view taken along the line A—A in FIG. 1 and the line B—B in FIG. 2.

As also shown in FIG. 3, the three-terminal magneto-sensing structure is fixedly mounted on one of the pole faces, for example, the N-pole face of the bias magnet 8 to make intimate contact therewith. The bias magnet 8 is received in a slot 15 of square shape bored in the substrate 6 and is fixedly supported in the slot 15 of the substrate 6 by being bonded thereto by a bonding agent 18.

According to such a structure, the conductors 17a, 17b and 17c have a very short length on the substrate 6 so that the adverse effect of external noises can be greatly suppressed. Thus, when the waveform shaping circuit 9 is disposed in the form of a hybrid integrated circuit on the substrate 6 as described above, a fine, or miniature conductor pattern can be provided, and the extending length of the conductors can be further shortened, so that the adverse effect of external noises can be more satisfactorily suppressed. A ceramic material is commonly used to make a substrate for a hybrid integrated circuit. The ceramic material is advantageous over an organic material such as an epoxy resin commonly used as a material of a printed circuit board in that its dielectric constant is smaller than that of such an organic material and it is hardly susceptible to an induction interference from, for example, adjacent signal lines. Therefore, the use of the ceramic material to make the substrate of the transducer of the embodiment according to the present invention exhibits a greater effect in conjunction with the formation of the miniature conductor pattern above described.

The integral combination of the sensing elements and the waveform shaping circuit in the present invention simplifies greatly the overall construction including the gear of magnetic material which is the object to be sensed, and thus provides numerous merits including the reduced assembling cost and the compact overall size.

Figure 4:
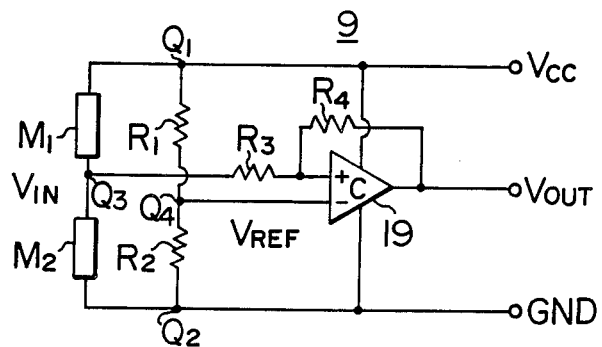
FIG. 4 is a circuit diagram showing the structure of the sensing and output generating circuit in the embodiment shown in FIG. 1.

Referring to FIG. 4, there is shown a circuit structure including the three-terminal magneto-sensing circuit constituted by the pair of magneto-resistors $M_1$ and $M_2$, and the waveform shaping circuit 9 for shaping the output signal of sinusoidal waveform from the magneto-sensing circuit into a rectangular waveform and generating an output signal of rectangular waveform. The pair of magneto-resistors $M_1$ and $M_2$ are so connected as to constitute a bridge circuit together with a pair of resistors $R_1$ and $R_2$. A pair of input terminals $Q_1$ and $Q_2$ of the bridge circuit are connected to a voltage source. For example, one input terminal $Q_1$ of the bridge circuit is connected to a source of voltage Vcc, and the other input terminal $Q_2$ is grounded. A pair of output terminals $Q_3$ and $Q_4$ of the bridge circuit are connected to a pair of input terminals respectively of a comparator 19 which constitutes the waveform shaping circuit 9 in combination with the resistors $R_1$ and $R_2$ in the bridge circuit. For example, one output terminal $Q_3$ is connected through an input resistor $R_3$ to the positive input terminal of the comparator 19, and the other output terminal $Q_4$ is directly connected to the negative input terminal of the comparator 19. A resistor $R_4$ acts as a feedback resistor for the comparator 19.

Figure 5:
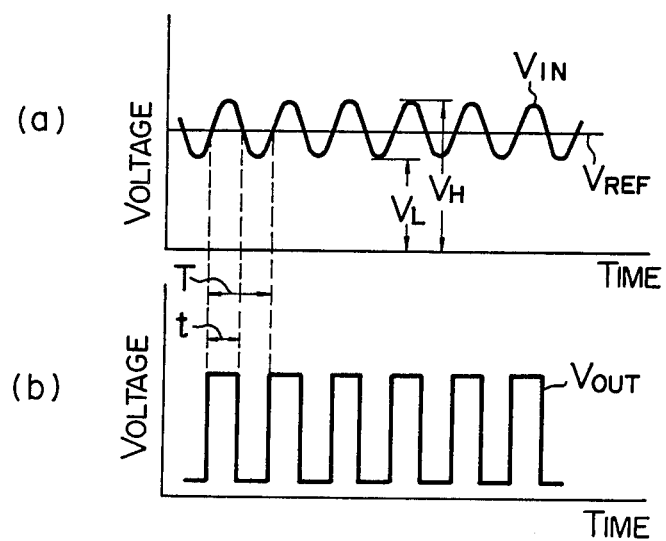
FIG. 5 shows operating signal waveforms appearing in the circuit shown in FIG. 4.

The signal waveforms appearing at the various parts of the circuit structure shown in FIG. 4 are shown in FIG. 5. FIG. 5(a) shows the waveform of the input signal applied to the positive input terminal of the comparator 19, that is, the signal $V_{IN}$ of sinusoidal waveform appearing from the output terminal $Q_3$ of the three-termnal magneto-sensing structure in response to the rotation of the gear 3. FIG. 5(a) also shows the level of a reference voltage $V_{REF}$ appearing at the connection point $Q_4$ between the voltage-dividing resistors $R_1$ and $R_2$ in the bridge circuit to be applied to the negative input terminal of the comparator 19. FIG. 5(b) shows the waveform of the output signal $V_{OUT}$ of rectangular pulse waveform generated from the comparator 19 after being shaped in the waveform.

Referring to FIG. 3 again, the pitch $P_1$ of the first magneto-resistor $M_1$ and the second magneto-resistor $M_2$ is selected to be $\frac{1}{2}$ of the pitch $P_2$ of the teeth of the gear 3. It will be readily understood that the three-terminal magneto-sensing structure provides its maximum output when the ratio between the pitches $P_1$ and $P_2$ is so selected. Reference symbol g in FIG. 3 designates the gap between the gear 3 and the first and second magneto-resistors $M_1$ and $M_2$. This gap g is generally selected to be not more than 0.2 mm, preferably 0.1 mm, so as to ensure the generation of an output signal of highest possible level from the magneto-resistors $M_1$ and $M_2$.

Referring to FIGS. 4 and 5 again, the resistors $R_1$ and $R_2$ in the waveform shaping circuit act as adjusting resistors determining the level of the reference voltage $V_{REF}$ applied to the negative input terminal of the comparator 19 and are preferably in the form of thick-film resistors deposited on the substrate 6. The duty factor t/T of the rectangular waveform $V_{OUT}$ appearing from the output terminal of the comparator 19 when the voltage $V_{IN}$ generated in response to the rotation of the gear 3 is applied to the positive input terminal of the comparator 19 from the connection point $Q_3$ between the magneto-resistors $M_1$ and $M_2$ constituting the three-terminal magneto-sensing structure and the reference voltage $V_{REF}$ is applied to the negative input terminal of the comparator 19, is determined by the level of $V_{IN}$ relative to that of $V_{REF}$. Generally, it is necessary to select the duty factor, $t/T \times 100$ (%), to be 50%. It will therefore be seen from FIG. 5 that it is necessary to select $V_{REF}$ to be $V_{REF} = \frac{1}{2}(V_H + V_L)$. Due to, however, the fact that the characteristics of the magneto-resistors $M_1$ and $M_2$ are not always the same but are variable depending on the lot and that the dimension of the gap g is also variable within the range of manufacturing tolerance, the value of $\frac{1}{2}(V_H + V_L)$ varies also depending on the individual products. It is therefore necessary to adjust the duty factor to be 50% for each individual product. The process required for the adjustment of the reference voltage $V_{REF}$, hence, the duty factor t/ is such that the relation between the adjusting resistors $R_1$ and $R_2$ is previously selected to be, for example, $R_1 < R_2$, and, while rotating the gear 3 in the actually mounted condition of the magnetoelectrical transducer, the resistance value of the adjusting resistor $R_1$ is gradually increased to adjust the level of the reference voltage $V_{REF}$ until the duty factor of 50% is attained. According to a preferred method of adjusting the resistance value of the resistor $R_1$, a portion of the thick-film resistor is removed bit by bit.

Figure 6:
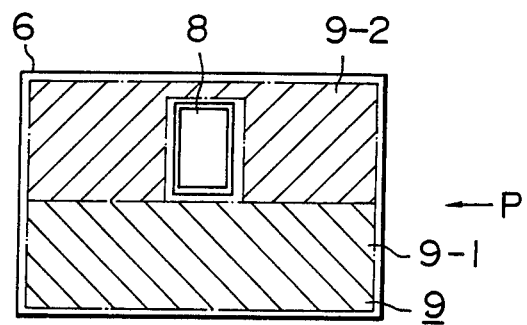
FIG. 6 is a plan view of the substrate when viewed from the gear side in the arrangement shown in FIG. 1.
Figure 7:
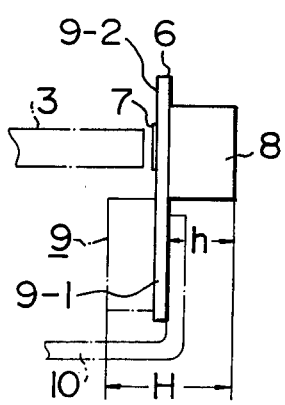
FIG. 7 is a schematic side elevation view of the arrangement of FIG. 6 when viewed in the direction of the arrow P.

As described hereinbefore, the waveform shaping circuit 9 is in the form of a hybrid integrated circuit formed on the substrate 6. From the aspect of the manufacturing cost, all of the components of the circuit 9 are gathered on one of the surfaces of the substrate 6 nearer to the gear 3 than the other, so as to provide a so-called one-sided hybrid integrated circuit. In this case, consideration is required so that the space 9-1 having disposed therein the components including the comparator 19 occupying a considerable height among those composing the circuit 9, as shown in FIGS. 6 and 7, is located in an area lower than the level of the gear 3 when viewed in FIG. 1, and only the conductors and thick-film resistors including the thick-film adjusting resistor $R_1$ deposited on the substrate 6 are disposed in the remaining space 9-2. This is because the adjustment of the resistance value of the adjusting resistor $R_1$ is required after the transducer is mounted in position. Otherwise, the gear 3 will interfere with the adjustment of the resistance value of the resistor $R_1$, and the adjustment will become impossible.

The embodiment of the transducer having such a construction could at least attain the object of the present invention, but the inventors have found the necessity for a further improvement in the proposed construction. More precisely, the inventors have found that, with the construction above described, the difficulty of circuit layout requires a slight increase in the area of the substrate 6, and, in addition, the illustrated thickness H becomes inevitably large resulting in difficulty of miniaturization due to the fact that the space portion underlying the bias magnet 8 having the height h shown in FIG. 7 cannot be effectively utilized. The inventors have further found that, in the arrangement of FIG. 7, the gear 3 interferes still with the adjustment of the resistance value of the resistor $R_1$ required for the adjustment of the duty factor, and the resistance adjustment requires a considerable length of time even when special tools are used.

Figure 8:
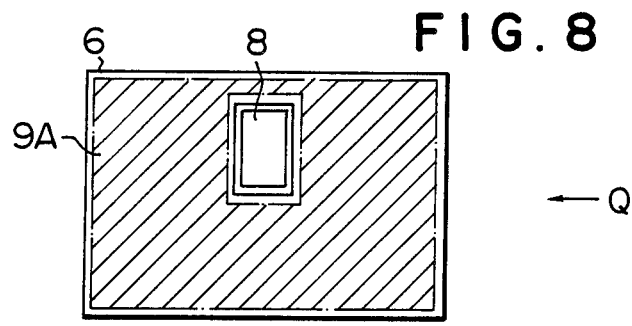
FIG. 8 is a plan view of the substrate in another embodiment of the present invention, when viewed from the gear side.
Figure 9:
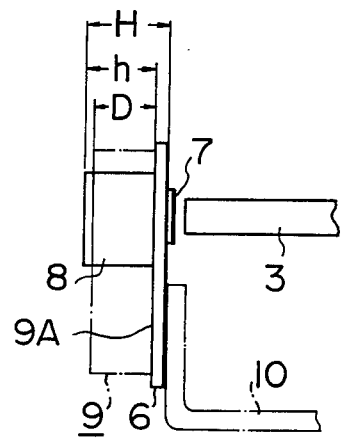
FIG. 9 is a schematic side elevation view of the arrangement of FIG. 8 when viewed in the direction of the arrow Q.

FIGS. 8 and 9 show another embodiment of the present invention or an improvement in the component arrangement shown in FIGS. 6 and 7. In this embodiment, the output conductors extending from the pair of magneto-resistors 7 are disposed on one of the surfaces of the substrate 6 nearer to the gear 3 than the other, and all of the components of the waveform shaping circuit 9 and the conductors required for wiring are disposed on the entire area of the other surface 9A of the substrate 6 remote from the gear 3. In this case, as is commonly known and customarily done in the art, the magneto-resistors 7 disposed on the substrate surface opposite to the gear 3 are electrically connected to the circuit 9 disposed on the other substrate 9A by conductors printed on the necessary portions of the surfaces of the substrate 6 or through one or more through-holes bored in the substrate 6 for establishing the electrical connections between the magneto-resistors 7 and the circuit 9, among necessary procedures.

Thus, as shown in FIG. 8, the entire space 9A, except the space portion occupied by the bias magnet 8, is now available for the circuit 9 thereby simplifying the layout of the circuit 9. Further, as seen in FIG. 9, the height D of the circuit parts of the circuit 9 would not substantially exceed the height h of the bias magnet 8 which is commonly as high as about 4 mm. Therefore, the thickness H of the actually mounted transducer including the thickness of the substrate 6 can be reduced to about the half of the prior art value, and the volume of the actually mounted transducer can be greatly decreased compared with the prior art one.

The embodiment shown in FIGS. 8 and 9 provides such a great additional merit that, because of the fact that the adjusting resistors $R_1$ and $R_2$ are also disposed on the surface of the substrate 6 on which the bias magnet 8 is disposed, that is, on the substrate surface remote from the gear 3, the step of function trimming or the step of adjusting the duty ratio while rotating the gear 3 can be very easily and accurately carried out within a short time compared with the prior art step.

Figure 10:
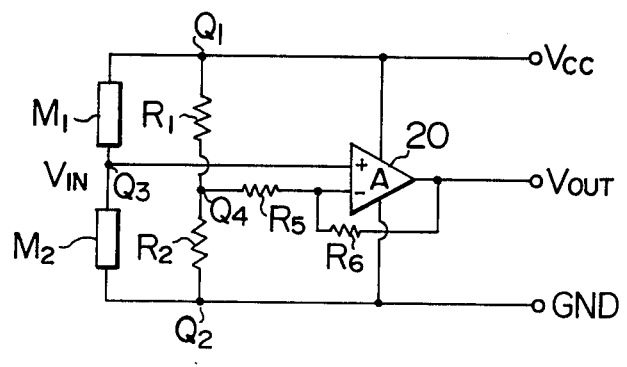
FIG. 10 is a circuit diagram showing the structure of a modification of the circuit shown in FIG. 4.

FIG. 10 shows a modification of the circuit structure shown in FIG. 4. In this modification, the comparator 19 is replaced by an amplifier 20, and the output voltage $V_{IN}$ of the three-terminal magnetic field-intensity sensing structure is applied to one input terminal of the amplifier 20, while the output voltage $V_{REF}$ of the voltage divider is applied through an input resistor $R_5$ to the other input terminal of the amplifier 20. A resistor $R_6$ is connected across the amplifier 20 to function as a feedback resistor. The amplifier 20 acts merely as a signal amplifying means, and its output $V_{OUT}$ has a sinusoidal waveform in which the amplitude of the sinusoidal input waveform $V_{IN}$ is amplified to a level determined by a predetermined amplification factor. Although this sinusoidal output waveform $V_{OUT}$ is used for the control of the rotation speed or angular position of rotation of the rotary machine, any detailed description will not be given herein since the manner of control is outside the scope of the present invention.

In the aforementioned embodiments of the present invention, a pair of magneto-resistors are incorporated in the transducer so as to improve the sensitivity of measurement. However, when the drawback of low sensitivity due to the use of a single magneto-resistor is allowable, it will be readily understood that incorporation of only one magneto-resistor to constitute part of a magneto-electrical transducer and such a magnetoelectrical transducer are also included in the scope of the present invention. In such a case, one of the magneto-resistors, for example, the magneto-resistor $M_1$ in FIG. 4 or FIG. 10 may be replaced by a conventional resistor.

Although the upper surface of the magneto-resistors $M_1$ and $M_2$ registers substantially with that of the substrate 6 in FIG. 2, the upper surface of the magneto-resistors $M_1$ and $M_2$ is shown protruding slightly from that of the substrate 6 in FIG. 1 in order to clearly illustrate the position of the magneto-resistors. It is preferable from the manufacturing viewpoint that the upper surface of the magneto-resistors $M_1$ and $M_2$ registers with that of the substrate 6. However, this is not an essential condition, and the upper surface of the magneto-resistors $M_1$ and $M_2$ may slightly protrude from that of the substrate 6 as shown in FIG. 1 without in any way obstructing the primary function of the transducer.

We claim:

1. An apparatus for magnetically detecting a position of a rotatable member having a magnetic body movable in association with a rotation operation comprising:
   means for generating a magnetic field;
   magneto-resistor means disposed so as to be magnetically coupled to said magnetic field generating means and arranged for being subjected to a portion of said magnetic field which exists in a space between said movable magnetic body and said magnetic field generating means, the intensity of said magnetic field of said portion being changeable in dependence upon movement of said movable magnetic body, said magneto-resistor means being responsive to a change in the intensity of said magnetic field at said portion for changing a resistance value thereof in accordance therewith;
   voltage source means for applying a predetermined voltage across said magneto-resistor means to derive therefrom a first electrical output signal corresponding to said resistance value;
   circuit means for converting said first electrical signal applied thereto into a second electrical signal having a predetermined waveform and generating said second electrical signal as an output; and
   a substrate, said circuit means and said magneto-resistor means being integrally mounted on said substrate so as to suppress external noise;
   wherein said substrate is formed of one of a ceramic material and an organic material.

2. An apparatus as claimed in claim 1, wherein said circuit means is in the form of a hybrid integrated circuit formed on said substrate.

3. An apparatus as claimed in claim 1 or 2, wherein said magneto-resistor means and said circuit means are disposed on a surface of said substrate opposite to said magnetic body.

4. An apparatus as claimed in claim 1 or 2, wherein said magneto-resistor means is disposed on one surface of said substrate opposite to said magnetic body, and said circuit means is disposed on the other surface of said substrate.

5. An apparatus as claimed in claim 3, wherein said circuit means includes resistor means whose resistance value is adjustable for providing said predetermined waveform.

6. An apparatus as claimed in claim 4, wherein said circuit means includes resistor means whose resistance value is adjustable for providing said predetermined waveform.

7. An apparatus as claimed in claim 1 or 2, wherein said magnetic body includes a train of teeth successively brought to a position opposite to said magneto-resistor means, and said magnetic field generating means includes a bias magnet for establishing said magnetic field, said magnet being mounted on said substrate.

8. An apparatus as claimed in claim 3, wherein said magnetic body includes a train of teeth successively brough to a position opposite to said magneto-resistor means, and said magnetic field generating means includes a bias magnet for establishing said magnetic field, said magneto-resistor means being disposed on one of the magnetic poles of said magnet, said magnet being fixedly supported in a slot extending through said substrate so that said magneto-resistor means is disposed opposite to said magnetic body, said magneto-resistor means being electrically connected to said circuit means by conductors printed on said substrate.

9. An apparatus as claimed in claim 4, wherein said magnetic body includes a train of teeth successively brought to a position opposite to said magneto-resistor means, and said magnetic field generating means includes a bias magnet for establishing said magnetic field, said magneto-resistor means being disposed on one of the magnetic poles of said magnet, said magnet being fixedly supported in a slot extending through said substrate so that said magneto-resistor means is disposed opposite to said magnetic body, said magneto-resistor means being electrically connected to said circuit means by conductors printed on said substrate.

10. An apparatus as claimed in claim 1 or 2, wherein said magneto-resistor means includes a pair of magneto-resistors to constitute a three-terminal magnetic field-intensity sensing structure for generating said first electrical output signal of sinusoidal waveform in response to a change in the intensity of said magnetic field.

11. An apparatus as claimed in claim 3, wherein said magneto-resistor means includes a pair of magneto-resistors to constitute a three-terminal magnetic field-intensity sensing structure for generating said first electrical output signal of sinusoidal waveform in response to a change in the intensity of said magnetic field.

12. An apparatus as claimed in claim 4, wherein said magneto-resistor means includes a pair of magneto-resistors to constitute a three-terminal magnetic field-intensity sensing structure for generating said first electrical output signal of sinusoidal waveform in response to a change in the intensity of said magnetic field.

13. An apparatus as claimed in claim 8, wherein said magneto-resistor means includes a pair of magneto-resistors to constitute a three-terminal magnetic field-intensity sensing structure for generating said first electrical output signal of sinusoidal waveform in response to a change in the intensity of said magnetic field.

14. An apparatus as claimed in claim 9, wherein said magneto-resistor means includes a pair of magneto-resistors to constitute a three-terminal magnetic field-intensity sensing structure for generating said first electrical output signal of sinusoidal waveform in response to a change in the intensity of said magnetic field.

15. An apparatus as claimed in claim 10, wherein said circuit means includes resistor means having an adjustable resistance value and connected to said voltage source means to generate a reference voltage, and a comparator for generating said second electrical output signal of rectangular waveform in response to the application of said first electrical signal and said reference voltage thereto.

16. An apparatus as claimed in claim 11, wherein said circuit means includes resistor means having an adjustable resistance value and connected to said voltage source means to generate a reference voltage, and a comparator for generating said second electrical signal of rectangular waveform in response to the application of said first electrical signal and said reference voltage thereto.

17. An apparatus as claimed in claim 12, wherein said circuit means includes resistor means having an adjustable resistance value and connected to said voltage source means to generate a reference voltage, and a comparator for generating said second electrical signal of rectangular waveform in response to the application of said first electrical signal and said reference voltage thereto.

18. An apparatus as claimed in claim 13, wherein said circuit means includes resistor means having an adjustable resistance value and connected to said voltage source means to generate a reference voltage, and a comparator for generating said second electrical signal of rectangular waveform in response to the application of said first electrical signal and said reference voltage thereto.

19. An apparatus as claimed in claim 14, wherein said circuit means includes resistor means having an adjustable resistance value and connected to said voltage source means to generate a reference voltage, and a comparator for generating said second electrical signal of rectangular waveform in response to the application of said first electrical signal and said reference voltage thereto.

20. An apparatus as claimed in claim 10, wherein said circuit means includes resistor means having an adjustable resistance value and connected to said voltage source means to generate a reference voltage, and an amplifier for generating said second electrical signal of sinusoidal waveform having an amplified amplitude in response to the application of said first electrical signal and said reference voltage thereto.

21. An apparatus as claimed in claim 11, wherein said circuit means includes resistor means having an adjustable resistance value and connected to said voltage source means to generate a reference voltage, and an amplifier for generating said second electrical signal of sinusoidal waveform having an amplified amplitude in response to the application of said first electrical signal and said reference voltage thereto.

22. An apparatus as claimed in claim 12, wherein said circuit means includes resistor means having an adjustable resistance value and connected to said voltage source means to generate a reference voltage, and an amplifier for generating said second electrical signal of sinusoidal waveform having an amplified amplitude in response to the application of said first electrical signal and said reference voltage thereto.

23. An apparatus as claimed in claim 13, wherein said circuit means includes resistor means having an adjustable resistance value and connected to said voltage source means to generate a reference voltage, and an amplifier for generating said second electrical output signal of sinusoidal waveform having an amplified amplitude in response to the application of said first electrical signal and said reference voltage thereto.

24. An apparatus as claimed in claim 14, wherein said circuit means includes resistor means having an adjustable resistance value and connected to said voltage source means to generate a reference voltage, and an amplifier for generating said second electrical signal of sinusoidal waveform having an amplified amplitude in response to the application of said first electrical signal and said reference voltage thereto.

25. An apparatus for magnetically detecting a position of a rotary body having a magnetic member movable in association with a rotation operation thereof, the apparatus comprising:
  means for generating a magnetic field;
  supporting means for rotatably supporting said rotary body in a magnetically coupled relation to said magnetic field generating means;
  magneto-resistor means being disposed so as to be subjected to said magnetic field, a movement of said rotary body causing a change in intensity of said magnetic field at a portion of said magnetic field to which said magneto-resistor means is subjected, said magneto-resistor means varying a resistance value thereof in response to the change in intensity of said magnetic field at said portion thereof;
  voltage source means for applying a predetermined voltage across said magneto-resistor means to derive therefrom a first electrical output signal corresponding to said resistance value;
  circuit means for converting said first electrical signal applied thereto into a second electrical signal having a predetermined waveform and generating said second electrical signal as an output;
  a substrate; and
  means for suppressing external holes, said noise suppressing means including integrally mounting said circuit means and said magneto-resistor means on said substrate;
  wherein said substrate is formed of one of a ceramic material and an organic material.

26. An apparatus as claimed in claim 25, wherein said circuit means includes resistor means whose resistance value is adjustable for providing said predetermined waveform.

27. An apparatus as claimed in claim 25, wherein said circuit means includes resistor means having an adjustable resistance value and connected to said voltage source means to generate a reference voltage, and a comparator for generating said second electrical output signal of rectangular waveform in response to the application of said first electrical signal and said reference voltage thereto.

* * * * *